(12) United States Patent
Li et al.

(10) Patent No.: US 11,269,529 B2
(45) Date of Patent: Mar. 8, 2022

(54) NEURAL NETWORK DATA PROCESSING APPARATUS, METHOD AND ELECTRONIC DEVICE

(71) Applicant: Beijing Baidu Netcom Science and Technology Co., Ltd., Beijing (CN)

(72) Inventors: Haoyang Li, Beijing (CN); Yuan Ruan, Beijing (CN); Yupeng Li, Beijing (CN)

(73) Assignee: Kunlunxin Technology (Beijing) Company Limited, Beijing (CN)

( * ) Notice: Subject to any disclaimer, the term of this patent is extended or adjusted under 35 U.S.C. 154(b) by 0 days.

(21) Appl. No.: 16/893,044

(22) Filed: Jun. 4, 2020

(65) Prior Publication Data

US 2021/0200437 A1 Jul. 1, 2021

(30) Foreign Application Priority Data

Dec. 31, 2019 (CN) .......................... 201911420592.1

(51) Int. Cl.
*G06F 9/02* (2006.01)
*G06F 3/06* (2006.01)
(Continued)

(52) U.S. Cl.
CPC ............ *G06F 3/064* (2013.01); *G06F 3/0623* (2013.01); *G06F 3/0656* (2013.01);
(Continued)

(58) Field of Classification Search
CPC .......... G06F 13/28; G06F 9/3836; G06N 3/08
See application file for complete search history.

(56) References Cited

U.S. PATENT DOCUMENTS 10,621,486 B2 * 4/2020 Yao ........................ G06F 7/5443
10,778,412 B2 * 9/2020 Chen ....................... G06N 3/08
(Continued)

FOREIGN PATENT DOCUMENTS

CN       101218569 A     7/2008
CN       102036069 A     4/2011
(Continued)

OTHER PUBLICATIONS

Extended European search report dated Nov. 17, 2020 for EP patent application No. EP20178272.
(Continued)

*Primary Examiner* — Cheng Yuan Tseng
(74) *Attorney, Agent, or Firm* — Quinn IP Law

(57) ABSTRACT

A neural network data processing apparatus includes: an instruction parsing module, configured to split a DMA task into multiple subtasks and acquire configuration information of a data sub-block corresponding to each subtask, where the subtasks are in a one-to-one correspondence with data sub-blocks of transported neural network data; a data reading module, configured to read a first data sub-block according to the configuration information, where the first data sub-block is a data sub-block among data sub-blocks corresponding to multiple subtasks; a data processing module, configured to compress the first data sub-block; a data write-out module, configured to output compressed data resulting from the compression of the first data sub-block.

11 Claims, 4 Drawing Sheets

(51) Int. Cl.
*G06F 13/28* (2006.01)
*G06N 3/08* (2006.01)
*G06F 9/38* (2018.01)

(52) U.S. Cl.
CPC ............ *G06F 3/0659* (2013.01); *G06F 13/28* (2013.01); *G06N 3/08* (2013.01); *G06F 3/0673* (2013.01); *G06F 9/3836* (2013.01)

(56) References Cited

U.S. PATENT DOCUMENTS

| | | | | |
|---|---|---|---|---|
| 10,796,220 | B2* | 10/2020 | Nekuii | G06F 17/142 |
| 10,869,036 | B2* | 12/2020 | Coelho | H04N 19/119 |
| 10,924,755 | B2* | 2/2021 | Ren | G06N 3/08 |
| 2009/0144589 | A1* | 6/2009 | Shasha | G06F 13/28 |
| | | | | 714/56 |
| 2011/0075943 | A1* | 3/2011 | Minami | H04N 1/41 |
| | | | | 382/233 |
| 2016/0342545 | A1* | 11/2016 | Arai | G06F 11/0772 |
| 2018/0052631 | A1* | 2/2018 | Kalyanasundharam | |
| | | | | G06F 12/0815 |
| 2018/0248562 | A1* | 8/2018 | Redfern | H03M 7/3082 |
| 2018/0300606 | A1* | 10/2018 | Corkery | G06F 9/30087 |
| 2019/0080222 | A1* | 3/2019 | Glesner | G06F 3/0608 |
| 2019/0197420 | A1* | 6/2019 | Singh | G06F 17/16 |
| 2019/0251418 | A1* | 8/2019 | Nakanishi | G06N 3/0454 |
| 2019/0279095 | A1* | 9/2019 | Guntoro | G06F 17/16 |
| 2020/0184332 | A1* | 6/2020 | Huang | G06F 9/30145 |
| 2020/0327078 | A1* | 10/2020 | Zhao | G06N 3/0454 |
| 2020/0364572 | A1* | 11/2020 | Senn | G06N 3/0454 |
| 2021/0064954 | A1* | 3/2021 | Choi | G06N 3/08 |
| 2021/0089873 | A1* | 3/2021 | Jiao | G06N 3/0454 |

FOREIGN PATENT DOCUMENTS

| | | |
|---|---|---|
| CN | 105653484 A | 6/2016 |
| CN | 107633298 A | 1/2018 |
| CN | 109074335 A | 12/2018 |
| CN | 109948774 A | 6/2019 |
| CN | 109961392 A | 7/2019 |
| CN | 110084364 A | 8/2019 |
| CN | 110197264 A | 9/2019 |
| CN | 110352412 A | 10/2019 |
| WO | 2016093990 A1 | 6/2016 |

OTHER PUBLICATIONS

Chinese Office Action for Chinese application No. 201911420592.1, dated Mar. 3, 2021.

* cited by examiner

NEURAL NETWORK DATA PROCESSING APPARATUS, METHOD AND ELECTRONIC DEVICE

CROSS-REFERENCE TO RELATED APPLICATION

The present application claims a priority to the Chinese patent application No. 201911420592.1 filed in China on Dec. 31, 2019, a disclosure of which is incorporated herein by reference in its entirety.

TECHNICAL FIELD

The present application relates to the field of artificial intelligence (AI) chip of computer technologies, in particular to a neural network data processing apparatus, a neural network data processing method and an electronic device.

BACKGROUND

Currently, neural networks are widely used, for example, convolutional deep neural networks (CDNN) are widely used in Internet applications, such as voice recognition, image identification, and natural language processing. However, neural network computing is often performed in a neural processing unit (NPU) and computation results have to be transported to an off-chip memory after the neural network computing is performed. Since the off-chip memory has a limited bandwidth, a time for transporting data out of the chip or into the chip may exceed the actual computing time in many practical service scenarios, thereby leading to a poor neural network performance.

SUMMARY

In a first aspect, the present application provides a neural network data processing apparatus, including: an instruction parsing module, configured to split a direct memory access (DMA) task into a plurality of subtasks and acquire configuration information of a data sub-block corresponding to each subtask, where the subtasks are in a one-to-one correspondence with data sub-blocks of transported neural network data; a data reading module, configured to read a first data sub-block according to the configuration information, where the first data sub-block is a data sub-block among data sub-blocks corresponding to the multiple subtasks; a data processing module, configured to compress the first data sub-block; a data write-out module, configured to output compressed data resulting from the compression of the first data sub-block.

Optionally, the data processing module is further configured to perform a data processing on the first data sub-block.

Optionally, the data processing module includes: a raw data buffer, configured to buffer the first data sub-block; a compression algorithm module, configured to compress the first data sub-block, to obtain compressed data resulting from the compression of the first data sub-block; a length field buffer, configured to buffer a length of the compressed data; a compression control state machine, configured to determine, according to a length of the first data sub-block and the length of the compressed data, whether there is a compression gain of the compression of the first data sub-block, generate a first channel selection signal if there is the compression gain, generate a second channel selection signal if there is no compression gain, and generate a third channel selection signal if the length buffer misses; a multiplexer, configured to read the compressed data from the compression algorithm module according to the first channel selection signal, or read the first data sub-block from the raw data buffer according to the second channel selection signal, or read the length of the compressed data from the length field buffer according to the third channel selection signal.

Optionally, the configuration information includes address information, a length and a sub-block type of the first data sub-block, and the data reading module includes: a data splicing module, configured to read the first data sub-block according to the configuration information of the first data sub-block, and shift and splice the read first data sub-block, to obtain a continuous and complete data stream of the first data sub-block.

Optionally, the data reading module further includes: a data output command buffer, configured to read the configuration information, and send a read command request to the data splicing module; a data buffer, configured to buffer the continuous and complete data stream output by the data splicing module; a data output state machine, configured to package the continuous and complete data stream in the data buffer, and output packaged data to the data processing module.

Optionally, the data reading module further includes: a read command buffer, configured to read the address information of the first data sub-block; a data reading state machine, configured to acquire an instruction from the read command buffer, and generate according to the address information an interface signal required for reading from an internal buffer.

Optionally, the data write-out module includes: a data output buffer, configured to buffer compressed data resulting from the compression of the first data sub-block; a configuration information buffer, configured to buffer the configuration information of the first data sub-block; an output address buffer, configured to buffer a destination address of the first data sub-block; an interface timing generation module, configured to, according to the configuration information and the destination address, generate a data mask code of the first data sub-block and generate an interface timing corresponding to the first data sub-block.

Optionally, the apparatus further includes: an address generation module, configured to generate an address channel signal of the first data sub-block that is supported by a bus protocol according to a destination address of the first data sub-block and a length of the compressed data, and output the address channel signal.

In a second aspect, the present application provides an electronic device including the neural network data processing apparatus provided in the present application.

In a third aspect, the present application provides a neural network data processing method, including: splitting a direct memory access (DMA) task into a plurality of subtasks and acquiring configuration information of a data sub-block corresponding to each subtask, where the subtasks are in a one-to-one correspondence with data sub-blocks of transported neural network data; reading a first data sub-block according to the configuration information, where the first data sub-block is a data sub-block among data sub-blocks corresponding to the multiple subtasks; compressing the first data sub-block and outputting compressed data resulting from the compression of the first data sub-block.

Optionally, the compressing the first data sub-block and outputting compressed data resulting from the compression of the first data sub-block includes: buffering the first data sub-block and a length of the first data sub-block; compressing the first data sub-block, to obtain the compressed data resulting from the compression of the first data sub-block, and recording a length of the compressed data; determining, according to the length of the first data sub-block and the length of the compressed data, whether there is a compression gain of the compression of the first data sub-block, outputting the compressed data if there is the compression gain, and outputting data of the first data sub-block if there is no compression gain.

Optionally, the configuration information includes address information of the first data sub-block, and the reading the first data sub-block according to the configuration information includes: reading the first data sub-block according to the address information of the first data sub-block, and shifting and splicing the read first data sub-block, to obtain a continuous and complete data stream of the first data sub-block.

Optionally, the method further includes: buffering a length of the compressed data; generating an address channel signal of the first data sub-block that is supported by a bus protocol according to a destination address of the first data sub-block and the length of the compressed data, and outputting the address channel signal.

BRIEF DESCRIPTION OF THE DRAWINGS

The drawings are only meant to facilitate an understanding of the present disclosure and by no means constitute a limitation of the present application.

DETAILED DESCRIPTION

Figure 1:
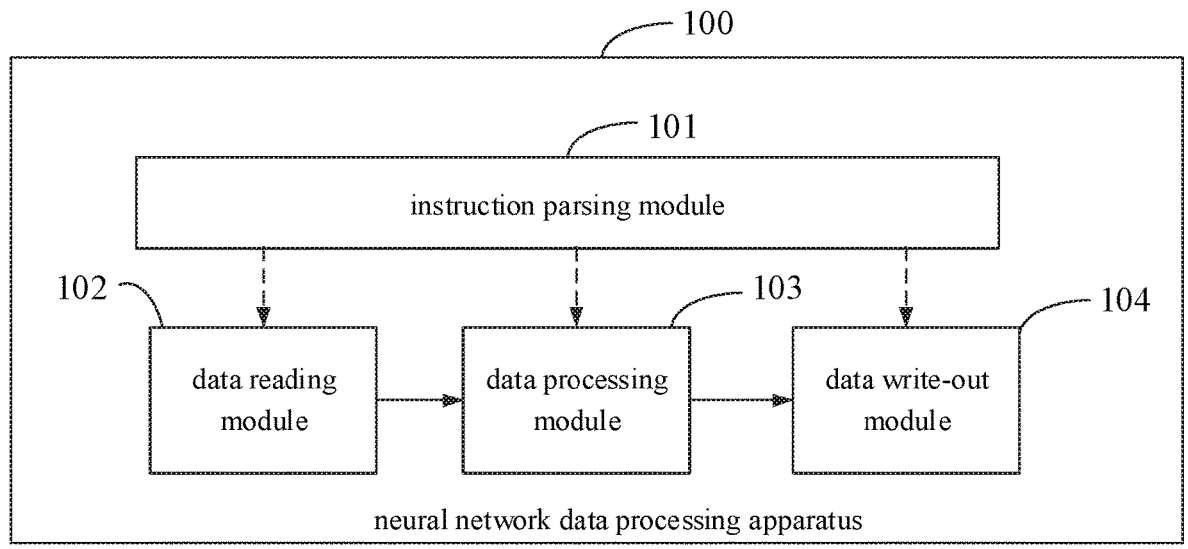
FIG. 1 is a structural diagram of a neural network data processing apparatus provided in the present application.

Hereinafter, the exemplary embodiments of the present application are described with reference to the accompanying drawings. Various details of embodiments of the present application are included in the drawing to facilitate understanding and these details should be construed as being merely exemplary. It is appreciated, modifications and improvements may be made in the described embodiments by a person of ordinary skill in the art without departing from the scope and spirit of the present application. Similarly, for clarity and conciseness, descriptions of well-known functions and structures are omitted hereinafter.

Referring to FIG. 1, a structural diagram of a neural network data processing apparatus provided in the present application is illustrated. As shown in FIG. 1, a neural network data processing apparatus 100 includes an instruction parsing module 101 configured to split a DMA task into multiple subtasks and acquire configuration information of a data sub-block corresponding to each subtask, where the subtasks are in a one-to-one correspondence with data sub-blocks of transported neural network data.

The neural network data processing apparatus 100 may be a chip (or called processor) configured to perform neural network computing, e.g., a neural processing unit (NPU) or a hardware accelerator.

The instruction parsing module 101 may be responsible for receiving and parsing to-be-processed instructions, and splitting the received DMA task (e.g., data transportation and processing task) into multiple subtasks.

Figure 2:
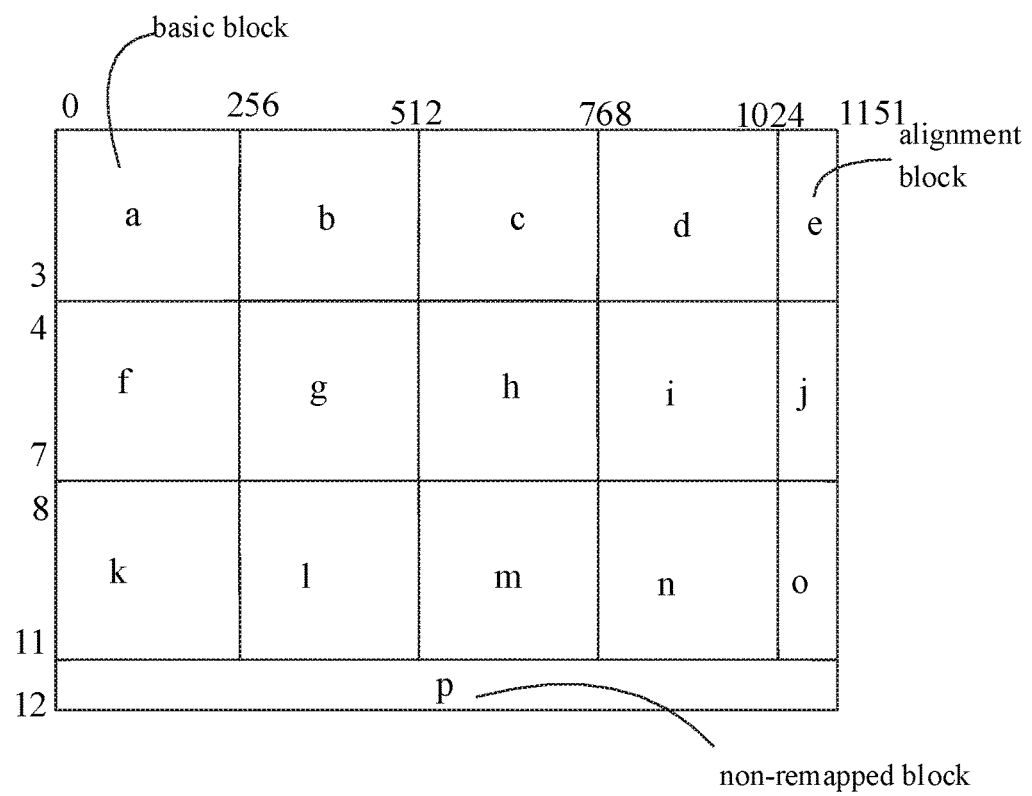
FIG. 2 is a schematic diagram of a data sub-block partition provided in the present application.

The transported neural network data may be data obtained after a neural network computing is completed, such as weight matrices or feature maps. The data sub-block may be a data sub-block derived from a partition of the transported data. For example, as shown in FIG. 2, the transported data may be partitioned into data sub-blocks such as a basic block, an alignment block and a non-remapped block. The data size of the basic block is fixed, which may be configured in advance. Specifically, the size of the basic block may be configured according to actual requirements. The alignment block and the non-remapped block are sub-blocks that may not form a basic block and remains after the transported data is partitioned into multiple basic blocks. Specifically as shown in FIG. 2, the remaining sub-blocks on the right side are called alignment blocks, and the remaining sub-blocks on the lower side are called non-remapped blocks.

Further, the acquiring configuration information of a data sub-block corresponding to each subtask may include generating configuration information of the data sub-block, and the configuration information may include information such as length, address and compression information of the data sub-block, where the compression information indicates whether the data sub-block is compressed.

The subtasks being in a one-to-one correspondence with data sub-blocks of transported neural network data may refer to that each subtask corresponds to a sub-block of the transported neural network data which may be a matrix. Subsequently, configuration information corresponding to each sub-block may be generated for other modules, and the configuration information may be referred to as task configuration information. Further, the configuration information may include various information required for other modules to process a sub-block, such as data address, length and information as to whether data is compressed.

Additionally, instructions that the instruction parsing module 101 is capable of processing may include a DMA configuration instruction, a DMA execution instruction, a DMA synchronization instruction and the like. The DMA configuration instruction is used to configure parameters of a subsequent DMA execution instruction. The DMA execution instruction is used to declare the beginning of a data transportation task and utilizes parameters configured by a previous DMA configuration instruction. The DMA synchronization instruction acts as a synchronization flag for the system, and after all instructions preceding the DMA synchronization instruction are executed, the apparatus returns a processing completed signal to complete the synchronization with upper layer software and hardware systems.

Further, having received an instruction, the instruction parsing module 101 may firstly determine a type of the instruction. If it is a DMA configuration instruction, the instruction parsing module 101 writes the instruction into a corresponding internal register for recording internally. If the instruction is a DMA execution instruction, the instruction parsing module 101 begins to generate task configuration information of sub-blocks according to existing configuration in the internal register. If the instruction is a DMA execution instruction, the instruction parsing module 101 sends an interrupt flag signal to a response processing module, where the flag denotes a total amount of data transported before the flag is sent.

Additionally, if a buffer function of the neural network data processing apparatus 100 is enabled, the instruction parsing module 101 may determine whether a buffer hit occurs according to a target address of the sub-block, and insert configuration information for a buffer refresh in case that a buffer miss occurs.

Further, task configuration information generated by the instruction parsing module 101 after processing the instruction may be categorized into four types, namely, basic block configuration information, alignment block configuration information, non-remapped block configuration information and buffer block configuration information.

Further, the instruction parsing module 101 may set whether to enable an address rearrangement function. If the address rearrangement function is not enabled, the instruction parsing module 101 processes all data as non-remapped blocks. When being processed as non-remapped blocks, the sub-blocks may not be compressed.

Additionally, the neural network in the present application includes, but is not limited to, CDNN, e.g., the neural network may be other deep neural networks.

The neural network data processing apparatus 100 further includes a data reading module 102 configured to read a first data sub-block according to the configuration information, where the first data sub-block is a data sub-block among data sub-blocks corresponding to the multiple subtasks.

The first data sub-block may be any data sub-block of the transported data. Optionally, the first data sub-block may be any basic block.

The reading a first data sub-block according to the configuration information may refer to reading from an internal buffer the data sub-block indicated by the configuration information.

The data reading module 102 may acquire the configuration information from the instruction parsing module 101, and read the first data sub-block according to the configuration information. Here, the reading may refer to reading from the internal buffer of the apparatus. For example, the data reading module 102 acquires configuration information from the instruction parsing module 101 and completes reading data from the internal buffer. Further, the read data may be arranged into certain internal data format (according to protocols such as advanced extensible interface (AXI) protocol, a simple data protocol composed of data-data valid signal) for delivering to a data processing module 103.

The neural network data processing apparatus 100 further includes the data processing module 103, which is configured to compress the first data sub-block.

The data processing module 103 acquires and compresses the first data sub-block output from the data reading module 102.

In the present application, the compression of the data sub-block may utilize a compression mode including, but not limited to, zero-value compression, run coding, Huffman coding, or Golomb coding.

The neural network data processing apparatus 100 further includes a data write-out module 104 configured to output compressed data resulting from the compression of the first data sub-block.

The data write-out module 104 may write the compressed data into an off-chip memory. Further, the data write-out module 104 may buffer the data processed by the data processing module, and generate, according to requirements of an output interface, corresponding data output interface timing.

It is noted, in the drawing related to the apparatus provided by the present application, broken lines represent that control flows are transmitted, which are used to control the modules. The solid lines represent data lines, i.e., data transmission between modules.

In this embodiment, by using the apparatus, data may be compressed on the basis of the data sub-block, thereby improving data transportation efficiency and improving neural network performance.

Optionally, the data processing module 103 is further configured to perform a data processing on the first data sub-block.

The data processing may include, for example, data shifting, converting to fixed-point, finding maximum value, and the like. Specifically, data processing such as data shifting, converting to fixed-point, or finding maximum value is performed on the raw data, compressed data or compressed data length of the first data sub-block, to improve data processing performance.

Figure 3:
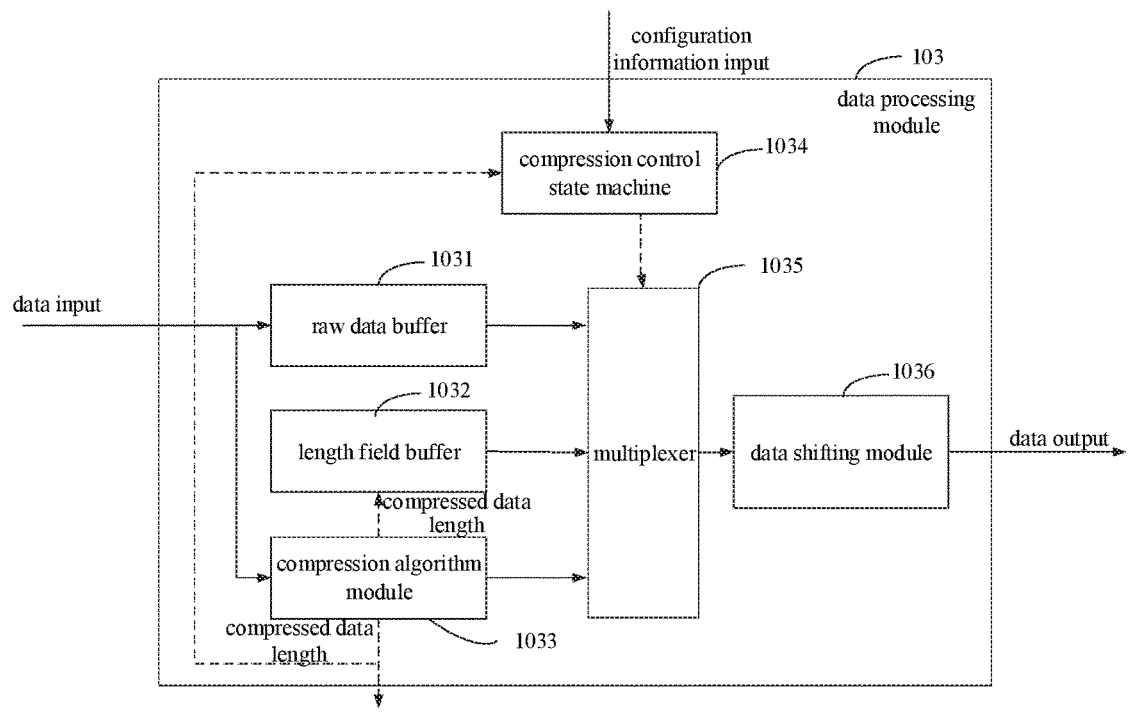
FIG. 3 is a structural diagram of a data processing module provided in the present application.

Optionally, as shown in FIG. 3, the data processing module 103 includes: a raw data buffer 1031, configured to buffer the first data sub-block; a compression algorithm module 1033, configured to compress the first data sub-block, to obtain compressed data resulting from the compression of the first data sub-block; a length field buffer 1032, configured to buffer a length of the compressed data; a compression control state machine 1034, configured to determine, according to a length of the first data sub-block and the length of the compressed data, whether there is a compression gain of the compression of the first data sub-block, generate a first channel selection signal if there is the compression gain, generate a second channel selection signal if there is no compression gain of the compression of the first data sub-block, and generate a third channel selection signal if the length buffer misses; a multiplexer 1035, configured to read the compressed data from the compression algorithm module according to the first channel selection signal, or read the first data sub-block from the raw data buffer according to the second channel selection signal, or read the length of the compressed data from the length field buffer according to the third channel selection signal.

The generating a third channel selection signal if the length buffer misses may refer to generating the third channel selection signal when the length field of compressed data misses a storage address space of the buffer, so that the multiplexer 1035 reads and outputs the compressed data length buffered in the length field buffer 1032. In specific, the length field may be treated as a length block.

Further, as shown in FIG. 3, the data processing module 103 may further include a data shifting module 1036 configured to output the compressed signal or the first data sub-block read by the multiplexer.

Of course, the data shifting module 1036 is merely an example. The data processing module 103 may for example include a module for preprocessing data, such as a module for data shifting, a module for converting data to fixed-point format or a module for finding maximum value.

The data processing module 103 may compress in real time data sub-blocks output by the data reading module 102 with a compression granularity of one sub-block.

As a whole, the raw data buffer 1031, length field buffer 1032, compression algorithm module 1033, compression control state machine 1034 and multiplexer 1035 may be referred to as a data compression module.

The raw data buffer 1031 may receive and buffer all data sent from the data reading module 102 for the multiplexer to read. Additionally, if the sub-block is a basic block and a compressed data length of the sub-block is less than an original data length, the raw data buffer 1031 may invalidate original information of corresponding basic block buffered therein to release storage space; if the sub-block is an alignment block, a non-remapped block, or a basic block with a compressed data length greater than or equal to the original length, the data is retrieved by the multiplexer 1035 from the raw data buffer 1031.

The length field buffer 1032 is a buffer designed to reduce the times of writing out the length field. The length field buffer 1032 may adopt a direct mapping or other mapping scheme to associate the storage space of the buffer with an actual storage address of the length field, and only write out data in the buffer when a buffer miss occurs or a task is completed. The length field buffer 1032 may receive the length information of each compressed basic block from the compression algorithm module 1033, and determine, according to the destination address of the basic block and an address mapping rule, a specific storage position of a corresponding length field in the buffer and flag the position as updated; when the next sub-block to be processed is a buffer block, the multiplexer 1035 reads all length field data flagged as updated from the length field buffer 1032 and clear all updated flags.

The compression algorithm module 1033 is configured to compress the basic block according to a compression algorithm. The compression algorithm includes, but is not limited to: zero-value compression, run coding, Huffman coding, or Golomb coding. When the sub-block is a basic block, the compression algorithm module 1033 receives the data from the data reading module, and performs a data compression by using an internally integrated compression algorithm. If the compressed data length is greater than or equal to the original data length, the compression algorithm module 1033 outputs the original data length directly and invalidates the compressed data to release internal space; if the compressed data length is less than the original data length, the compression algorithm module 1033 outputs and validates the compressed data length, and outputs the compressed data once the multiplexer selects the compression algorithm module 1033. After the compressed data is output, the compression algorithm module 1033 invalidates the storage positions to release the storage space.

The compression control state machine 1034 may receive and process the configuration information output by the instruction parsing module 102, and determine, according to the sub-block type and data length information in the configuration information in conjunction with the compressed data length information provided by the compression algorithm module 1033, a data channel to select. In other words, when the sub-block is a basic block and the compressed data length is less than the original data length, a first channel selection signal, i.e., compression algorithm module channel selection signal, is generated; when the sub-block is a basic block and the compressed data length is greater than or equal to the original data length, a second channel selection signal, i.e., raw data buffer channel selection signal, is generated; additionally, when the sub-block is an alignment block or a non-remapped block, the second channel selection signal, i.e., raw data buffer channel selection signal, is generated; and when the sub-block is a buffer block, a length field buffer channel selection signal is generated.

The multiplexer 1035 acquires and outputs data from a corresponding channel according to the channel selection signal generated by the compression control state machine 1034. For example, the multiplexer 1035 reads the compressed data from the compression algorithm module according to the first channel selection signal, or reads the first data sub-block from the raw data buffer according to the second channel selection signal.

The data shifting module 1036 may shift, according to the destination address of the data sub-block, the data output by the data compression module, so that the data match a bit width of a corresponding output interface.

In this implementation, the compression module enables a controllable length of data output by the data processing module 103 as well as a compression in the DMA channel, so as to reduce buffer overhead.

Figure 4:
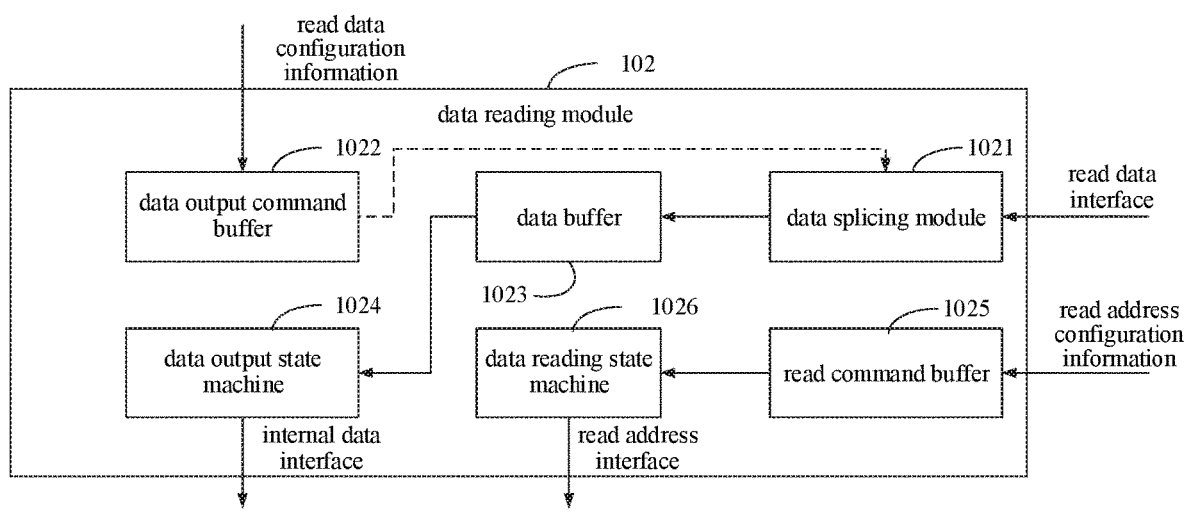
FIG. 4 is a structural diagram of a data reading module provided in the present application.

Optionally, the configuration information includes address information, a length and a sub-block type of the first data sub-block. As shown in FIG. 4, the data reading module 102 includes: a data splicing module 1021 configured to read the first data sub-block according to the configuration information of the first data sub-block, and shift and splice the read first data sub-block, to obtain a continuous and complete data stream of the first data sub-block.

The address information of the first data sub-block may be discontinuous address information. Specifically, the address of each data sub-block according to the present application may include discontinuous addresses, as shown exemplarily in FIG. 2. In other words, the first data sub-block is read in a skipping manner. Taking the basic block a as shown in FIG. 2 as an example of the first data sub-block, firstly, a first row of data of the basic block a is read; secondly, a second row of data of the basic block a is read; the first and second rows of data are spliced; then the next row of data is read and spliced with the previously spliced data, to obtain a continuous and complete data stream of the first data sub-block.

Since the read first data sub-block is shifted and spliced to obtain a continuous and complete data stream of the first data sub-block, a compression of discontinuous data is supported and a size of to-be-compressed data sub-block may be increased, thereby improving compression efficiency.

Optionally, the data reading module 102 further includes: a data output command buffer 1022 configured to read the configuration information, and send a read command request to the data splicing module; a data buffer 1023 configured to buffer the continuous and complete data stream output by the data splicing module; a data output state machine 1024 configured to package the continuous and complete data stream in the data buffer, and output packaged data to the data processing module.

The configuration information may further include compression information, where the compression information indicates whether the data sub-block is compressed.

The data output command buffer 1022 may read at least one of the length and the compression information from the instruction parsing module 101. For example, as shown in FIG. 4, the data output command buffer 1022 receives, from the instruction parsing module 101, data configuration information which may be configuration information generated by the instruction parsing module 101 and include at least one of the length and the compression information of the data sub-block, and stores the data configuration information temporarily. The received configuration information are used to send a read command request and to process received data respectively.

The data buffer 1023 may store data temporarily, to avoid data loss due to a belated processing on the part of a subsequent data output state machine. Further, the data buffer 1023 may provide a quantity of buffered data to the data reading state machine to control a quantity of data for which read commands are issued, so as to prevent a buffer overflow caused by receiving excessive data and an ensuing data loss.

The data output state machine 1024 may acquire an instruction from the data output command buffer, and package the data of the data buffer into a predetermined format according to the configuration information and send the data via an internal data interface to subsequent data processing module.

Optionally, the data reading module 102 further includes: a read command buffer 1025 configured to read the address information of the first data sub-block; a data reading state machine 1026 configured to acquire an instruction from the read command buffer, and generate according to the address information an interface signal required for reading from an internal buffer.

The read command buffer 1025 may receive address information of the first data sub-block from the instruction parsing module 101. For example, as shown in FIG. 4, the read command buffer 1025 reads address configuration information, which is configuration information generated by the instruction parsing module 101 and includes at least the address information of the first data sub-block. Additionally, the configuration information received by the read command buffer 1025 are used to send a read command request and to process received data respectively.

The data reading state machine 1026 may acquire an instruction from the read command buffer 1025 and generate according to the configuration information an interface signal required for reading from an internal buffer. Here, the interface signal may be a signal used to trigger an internal data reading.

By means of the read command buffer 1025 and the data reading state machine 1026, a data reading accuracy of the data reading module 102 may be improved.

Figure 5:
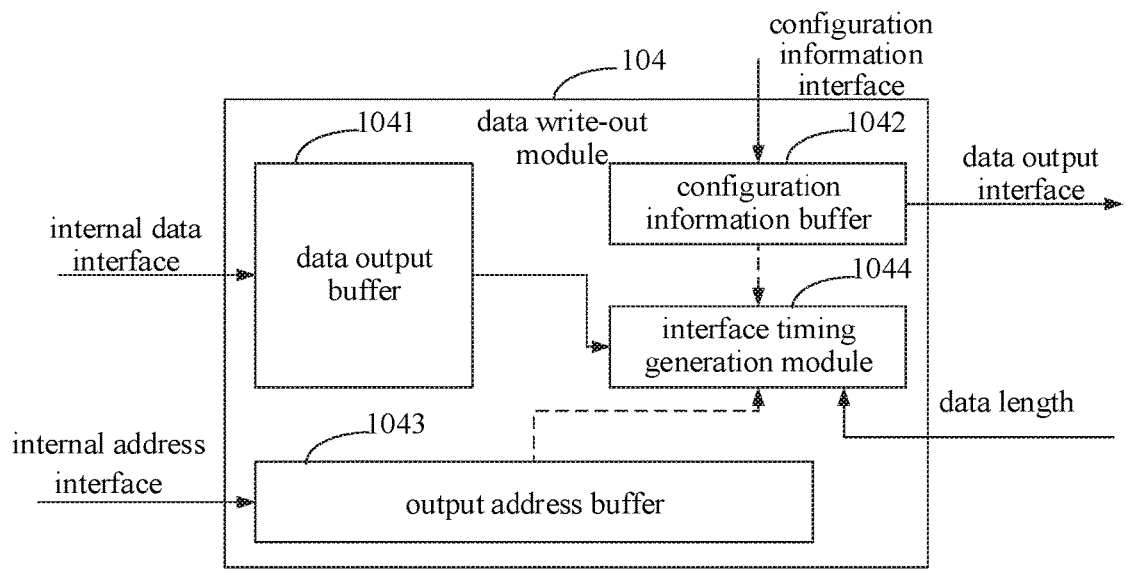
FIG. 5 is a structural diagram of a data write-out module provided in the present application.

Optionally, as shown in FIG. 5, the data write-out module 104 includes: a data output buffer 1041 configured to buffer compressed data resulting from the compression of the first data sub-block; a configuration information buffer 1042 configured to buffer the configuration information of the first data sub-block; an output address buffer 1043 configured to buffer a destination address of the first data sub-block; an interface timing generation module 1044 configured to, according to the configuration information and the destination address, generate a data mask code of the first data sub-block and generate an interface timing corresponding to the first data sub-block.

The data write-out module is responsible for buffering data processed by the data processing module and generating corresponding data output interface timing according to requirements of the output interface. As shown in FIG. 5, the data write-out module includes the data output buffer, the configuration information buffer, the interface timing generation module and the output address buffer.

The data output buffer 1041 may receive and store temporarily to-be-output data processed by the data processing module 103. The to-be-output data specifically includes compressed data or original data of the data sub-block.

The configuration information buffer 1042 may receive configuration information from the instruction parsing module 101. The configuration information is mainly used to generate a data mask code signal of the interface.

The output address buffer 1043 may intercept a target address, i.e., output address, of the data sub-block from a write address interface for use by the interface timing generation module 1044.

The interface timing generation module 1044 may acquire configuration information from the configuration information buffer 1042 and acquire data from the data output buffer 1041, generate a data mask code corresponding to the data according to the configuration information and then generate a corresponding interface timing according to a protocol rule of the data output interface. Additionally, the interface timing generation module 1044 may improve partial write for some data sub-blocks, where the partial write refers to that the bit width of written data is less than the bit width of a memory. For example, it is determined whether a start memory address of a current data sub-block is aligned; if the address is not aligned, it is determined whether memory addresses of a previous and a current data sub-blocks are continuous; if the addresses are continuous, it is determined whether the previous data sub-block is compressed; if the previous sub-block is compressed, a complete write is performed on a first beat of the current data sub-block, where the complete write refers to that a bit width of written data is equal to the bit width of the memory. Thereby, a quantity of partial writes of the current data sub-block is reduced, that is, partial write of data sub-block is improved and the quantity of writes is reduced, so as to further improve processing performance of the neural network. Additionally, if the improvement of partial write is done, the data mask code may be modified to represent that the partial write is converted to a complete write.

Further, the interface timing generation module 1044 may acquire information on address generation from the output address buffer 1043. For a bus protocol in which an address channel and a data channel are separated, a sequential order of data of the two channels may be controlled.

In this implementation, the data write-out module 104 may improve the writing performance of the neural network.

Figure 6:
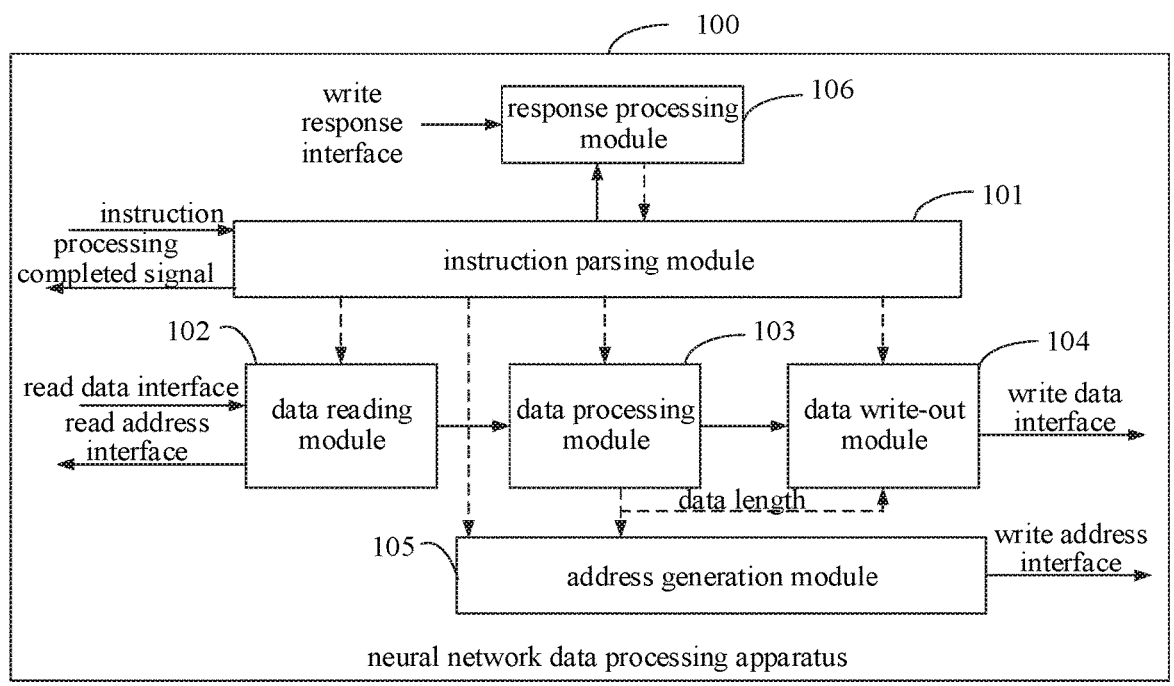
FIG. 6 is a structural diagram of another neural network data processing apparatus provided in the present application.

Optionally, as shown in FIG. 6, the apparatus further includes: an address generation module 105 configured to generate an address channel signal of the first data sub-block that is supported by a bus protocol according to a destination address of the first data sub-block and a length of the compressed data, and output the address channel signal.

The destination address of the first data sub-block may be a memory address of the first data sub-block in an off-chip memory, or an output address.

The generating an address channel signal of the first data sub-block that is supported by a bus protocol according to a destination address of the first data sub-block and a length of the compressed data may refer to acquiring the address channel signal of the first data sub-block that is supported by a bus protocol by splitting the destination address according to the length of the compressed data using an address splitting logic. For example, when the length of the compressed data is greater than a maximum random access address supported by the bus protocol, the destination address of the first data sub-block is split, e.g., into 128B or 64B address channel signals, so as to support random access of data through the address channel signals; or, when the length of the compressed data is less than a maximum random access address supported by the bus protocol, the destination address of the first data sub-block is used as the address channel signal, so as to support random access of data through the address channel signal.

Further, if a compression function is enabled and the processed data sub-block is a basic block, the address generation module 105 may additionally receive the compressed data length information output by the data processing module 103, and generate, according to the compressed data length and the received configuration information, the address channel signal required by corresponding bus protocol.

Optionally, as shown in FIG. 6, the apparatus further includes a response processing module 106 configured to process a response signal returned from an off-chip memory, bus or on-chip network, and generate, according to the response signal and an interrupt flag sent by the instruction parsing module 101, a processing complete interrupt and send the interrupt to the instruction parsing module 101.

For example, upon receiving an instruction, the instruction parsing module 101 determines that it is a DMA synchronization instruction, then the instruction parsing module 101 sends to the response processing module an interrupt flag signal denoting a total amount of data transported before the flag is sent.

Further, the response processing module 106 may intercept information from a configuration information output interface of the instruction parsing module 101 and count with an instruction counter; upon receiving the interrupt flag sent by the instruction parsing module 101, the response processing module 106 saves the current value of the instruction counter; meanwhile, the response processing module 106 may receive information from a write response interface and count with a response counter; the response processing module 106 keeps comparing the instruction counter value saved when the interrupt flag arrives and the current value of the response counter, and in case the latter is greater than the former, which means all instructions before the interrupt flag are executed, the response processing module 106 generates and sends a processing complete interrupt to the instruction parsing module 101, and invalids the saved instruction counter value.

Further, as shown in FIG. 6, the apparatus may include: a write response interface, a read data interface, a read address interface, a write data interface and a write address interface. The write response interface, the write data interface and the write address interface may be write interfaces of an off-chip memory, or a bus connected to write interfaces of an off-chip memory, or write interfaces of an on-chip network. The read data interface and the read address interface may be read interfaces of an on-chip buffer, or a bus connected to read interfaces of an on-chip buffer, or read interfaces of an on-chip network.

In this embodiment, by using the apparatus, data may be compressed on the basis of the data sub-block, thereby improving data transportation efficiency and improving neural network performance.

The present application further provides an electronic device including the neural network data processing apparatus provided by the present application. The electronic device includes, but is not limited to: a mobile phone, a computer, a server and other electronic devices capable of neural network computing.

Figure 7:
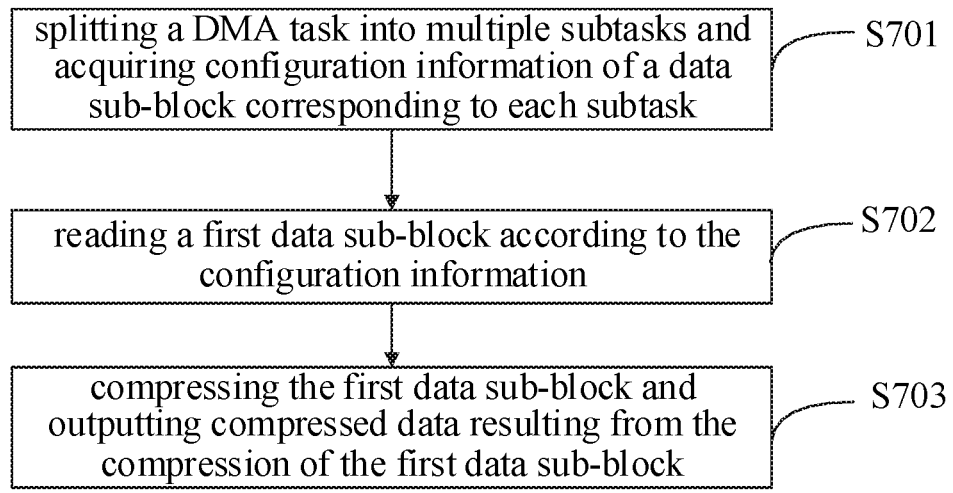
FIG. 7 is a flow diagram of a neural network data processing method provided in the present application.

Referring to FIG. 7, a flow diagram of a neural network data processing method provided in the present application is illustrated. As shown in FIG. 7, the method includes following steps.

Step S701 includes: splitting a DMA task into multiple subtasks and acquiring configuration information of a data sub-block corresponding to each subtask, where the subtasks are in a one-to-one correspondence with data sub-blocks of transported neural network data.

The DMA task may be a data transportation task, or a data transportation and processing task.

The transported neural network data may be data obtained after a neural network computing is completed, such as weight matrices or feature maps. The data sub-block may be a data sub-block derived from a partition of the transported data. For example, as shown in FIG. 2, the transported data may be partitioned into data sub-blocks such as a basic block, an alignment block and a non-remapped block. The data size of the basic block is fixed, which may be configured in advance. Specifically, the size of the basic block may be configured according to actual requirements. The alignment block and the non-remapped block are sub-blocks that may not form a basic block and remains after the transported data is partitioned into multiple basic blocks. Specifically as shown in FIG. 2, the remaining sub-blocks on the right side are called alignment blocks, and the remaining sub-blocks on the lower side are called non-remapped blocks.

Further, the acquiring configuration information of a data sub-block corresponding to each subtask may include generating configuration information of the data sub-block, and the configuration information may include information such as length, address and compression information of the data sub-block, where the compression information indicates whether the data sub-block is compressed.

The subtasks being in a one-to-one correspondence with data sub-blocks of transported neural network data may refer to that the DMA task corresponds to the transported neural network data and after the DMA task is split into subtasks, the transported neural network data is correspondingly split into data sub-blocks. For example, if the DMA task is a data transportation task, a subtask may be a task to transport one data sub-block; if the DMA task is a data transportation and processing task, a subtask may be a task to transport and process one data sub-block.

Additionally, the neural network in the present application includes, but is not limited to, CDNN, e.g., the neural network may be other deep neural networks.

Step S702 includes: reading a first data sub-block according to the configuration information, where the first data sub-block is a data sub-block among data sub-blocks corresponding to the multiple subtasks.

The first data sub-block may be any data sub-block of the transported data. Optionally, the first data sub-block may be any basic block.

The reading a first data sub-block according to the configuration information may refer to reading from an internal buffer the data sub-block indicated by the configuration information.

It is noted, the step S702 and step S703 according to the present application are described with respect to a first data sub-block. Since the first data sub-block may be any data sub-block of the transported data, the step S702 and step S703 may be implemented for any data sub-block according to the present application.

A step S703 includes: compressing the first data sub-block and outputting compressed data resulting from the compression of the first data sub-block.

In the present application, the compression of the data sub-block may utilize a compression mode including, but not limited to, zero-value compression, run coding, Huffman coding, or Golomb coding.

The outputting compressed data resulting from the compression of the first data sub-block may refer to writing the compressed data into an off-chip memory.

It is noted, the neural network data processing method provided in the present application may be applied to a chip (or called processor) configured to perform neural network computing, e.g., an NPU or a hardware accelerator.

According to the present application, by using the foregoing steps, data may be compressed on the basis of the data sub-block, thereby improving data transportation efficiency and improving neural network performance, as well as improving an equivalent bandwidth of an NPU.

Figure 8:
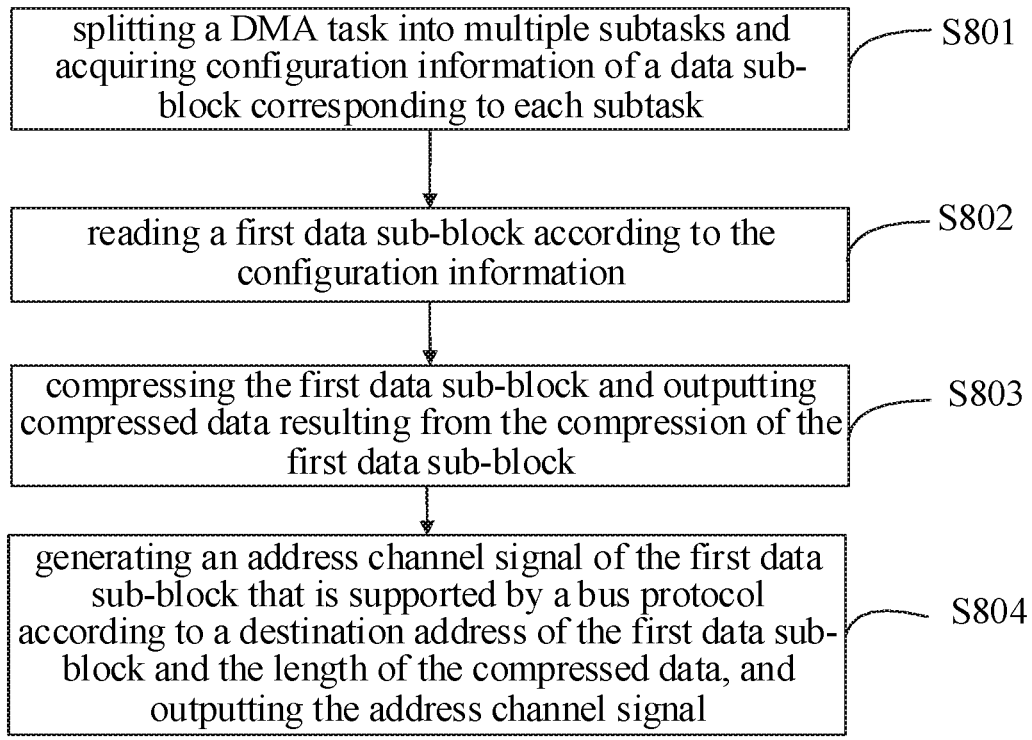
FIG. 8 is a flow diagram of another neural network data processing method provided in the present application.

Referring to FIG. 8, a flow diagram of another neural network data processing method provided in the present application is illustrated. As shown in FIG. 8, the method includes following steps.

A step S801 includes: splitting a DMA task into multiple subtasks and acquiring configuration information of a data sub-block corresponding to each subtask, where the subtasks are in a one-to-one correspondence with data sub-blocks of transported neural network data.

A step S802 includes: reading a first data sub-block according to the configuration information, where the first data sub-block is a data sub-block among data sub-blocks corresponding to the multiple subtasks.

Optionally, the configuration information includes address information of the first data sub-block, and the reading the first data sub-block according to the configuration information includes: reading the first data sub-block according to the address information of the first data sub-block, and shifting and splicing the read first data sub-block, to obtain a continuous and complete data stream of the first data sub-block.

The address information of the first data sub-block may be discontinuous address information. Specifically, the address of each data sub-block according to the present application may include discontinuous addresses, as shown exemplarily in FIG. 2. In other words, the first data sub-block is read in a skipping manner. Taking the basic block a as shown in FIG. 2 as an example of the first data sub-block, firstly, a first line of data of the basic block a is read; secondly, a second line of data of the basic block a is read; the first and second lines of data are spliced; then the next line of data is read and spliced with the previously spliced data, to obtain a continuous and complete data stream of the first data sub-block.

Since the read first data sub-block is shifted and spliced to obtain a continuous and complete data stream of the first data sub-block, a compression of discontinuous data is supported and a size of to-be-compressed data sub-block may be increased, thereby improving compression efficiency.

A step S803 includes: compressing the first data sub-block and outputting compressed data resulting from the compression of the first data sub-block.

Optionally, the compressing the first data sub-block and outputting compressed data resulting from the compression of the first data sub-block includes: buffering the first data sub-block and a length of the first data sub-block; compressing the first data sub-block, to obtain the compressed data resulting from the compression of the first data sub-block, and recording a length of the compressed data; determining, according to the length of the first data sub-block and the length of the compressed data, whether there is a compression gain of the compression of the first data sub-block, outputting the compressed data if there is the compression gain, and outputting data of the first data sub-block if there is no compression gain of the compression of the first data sub-block.

The determining, according to the length of the first data sub-block and the length of the compressed data, whether there is a compression gain of the compression of the first data sub-block may refer to determining whether the length of the compressed data is less than the length of the first data sub-block, if so, it is determined that there is a compression gain of the compression of the first data sub-block; otherwise, it is determined that there is no compression gain. Optionally, a quantity of beats required for the transmission of the compressed data is determined according to the length of the compressed data, and a quantity of beats required for the transmission of the first data-sub-block is determined according to the length of the first data sub-block. If the quantity of beats required for the transmission of the compressed data is less than the quantity of beats required for the transmission of the first data-sub-block, it is determined that there is a compression gain of the compression of the first data sub-block; otherwise, it is determined that there is no compression gain.

The buffering the first data sub-block and a length of the first data sub-block may be understood as buffering raw data and an original length of the first data sub-block.

The compression may be performed in the DMA of the NPU. Since the compression is performed in the DMA, there is no need to provide separately a large buffer in the NPU, thereby reducing buffer space overhead of the NPU.

Since the compressed data is only output on the condition that the length of the compressed data is less than the length of the first data sub-block, the data length may be controlled to avoid reserving excessive memory space, thereby saving memory space.

Optionally, the method further includes: step S804: buffering a length of the compressed data; and step S805: generating an address channel signal of the first data sub-block that is supported by a bus protocol according to a destination address of the first data sub-block and the length of the compressed data, and outputting the address channel signal.

The destination address of the first data sub-block may be a memory address of the first data sub-block in an off-chip memory, or an output address.

The generating an address channel signal of the first data sub-block that is supported by a bus protocol according to a destination address of the first data sub-block and a length of the compressed data may refer to acquiring the address channel signal of the first data sub-block that is supported by a bus protocol by splitting the destination address according to the length of the compressed data using an address splitting logic. For example, when the length of the compressed data is greater than a maximum random access address supported by the bus protocol, the destination address of the first data sub-block is split, e.g., into 128B or 64B address channel signals, so as to support random access of data through the address channel signals; or, when the length of the compressed data is less than a maximum random access address supported by the bus protocol, the destination address of the first data sub-block is used as the address channel signal, so as to support random access of data through the address channel signal.

According to this implementation, a random access of compressed data is supported by means of the address channel signal, thereby further improving the performance of the neural network.

Multiple optional implementations are provided in this embodiment on the basis of the embodiment as shown in FIG. 1, and may improve the performance of the neural network.

It is understood, the foregoing processes may be employed with steps thereof being reordered, added, or deleted. For example, as long as intended effects of the technical solution of the present disclosure may be achieved, the steps set forth in the present application may be implemented in parallel, in series or in a different order, which is not limited herein.

The foregoing specific implementations by no means constitute any limitation of the scope of the present application. It is appreciated by those skilled in the art that various modifications, combinations, sub-combinations or substitutions may be made according to design requirements or other factors. Any modification, equivalent substitution or improvement made without departing from the spirit and principle of the present application shall be construed as falling within the scope of the present application.

What is claimed is:

1. A neural network data processing apparatus, comprising:
    an instruction parsing module, configured to split a direct memory access (DMA) task into a plurality of subtasks and acquire configuration information of a data sub-block corresponding to each subtask, wherein the plurality of subtasks are in a one-to-one correspondence with data sub-blocks of transported neural network data;
    a data reading module, configured to read a first data sub-block according to the configuration information, wherein the first data sub-block is a data sub-block among data sub-blocks corresponding to the plurality of subtasks;
    a data processing module, configured to compress the first data sub-block; and
    a data write-out module, configured to output compressed data resulting from the compression of the first data sub-block;
    the data processing module comprises:
        a raw data buffer, configured to buffer the first data sub-block;
        a compression algorithm module, configured to compress the first data sub-block, to obtain compressed data resulting from the compression of the first data sub-block;
        a length field buffer, configured to buffer a length of the compressed data;
        a compression control state machine, configured to determine, according to a length of the first data sub-block and the length of the compressed data, whether there is a compression gain of the compression of the first data sub-block, generate a first channel selection signal if there is the compression gain, generate a second channel selection signal if there is no compression gain, and generate a third channel selection signal if the length field buffer misses; and
        a multiplexer, configured to read the compressed data from the compression algorithm module according to the first channel selection signal, or read the first data sub-block from the raw data buffer according to the second channel selection signal, or read the length of the compressed data from the length field buffer according to the third channel selection signal.

2. The neural network data processing apparatus according to claim 1, wherein the data processing module is further configured to perform data processing on the first data sub-block.

3. The neural network data processing apparatus according to claim 1, wherein the configuration information comprises address information, a length and a sub-block type of the first data sub-block, and the data reading module comprises:
    a data splicing module, configured to read the first data sub-block according to the configuration information of the first data sub-block, and shift and splice the read first data sub-block, to obtain a continuous and complete data stream of the first data sub-block.

4. The neural network data processing apparatus according to claim 3, wherein the data reading module further comprises:
    a data output command buffer, configured to read the configuration information, and send a read command request to the data splicing module;
    a data buffer, configured to buffer the continuous and complete data stream output by the data splicing module; and
    a data output state machine, configured to package the continuous and complete data stream in the data buffer, and output packaged data to the data processing module.

5. The neural network data processing apparatus according to claim 4, wherein the data reading module further comprises:
    a read command buffer, configured to read the address information of the first data sub- block; and
    a data reading state machine, configured to acquire an instruction from the read command buffer, and generate according to the address information an interface signal required for reading from an internal buffer.

6. The neural network data processing apparatus according to claim 1, wherein the data write-out module comprises:
    a data output buffer, configured to buffer compressed data resulting from the compression of the first data sub-block;
    a configuration information buffer, configured to buffer the configuration information of the first data sub-block;
    an output address buffer, configured to buffer a destination address of the first data sub- block; and
    an interface timing generation module, configured to, according to the configuration information and the destination address, generate a data mask code of the first data sub-block and generate an interface timing corresponding to the first data sub-block.

7. The neural network data processing apparatus according to claim 1, further comprising:
    an address generation module, configured to generate an address channel signal of the first data sub-block that is supported by a bus protocol according to a destination address of the first data sub-block and a length of the compressed data, and output the address channel signal.

8. An electronic device, comprising a neural network data processing apparatus, wherein the neural network data processing apparatus comprises:
    an instruction parsing module, configured to split a direct memory access (DMA) task into a plurality of subtasks and acquire configuration information of a data sub-block corresponding to each subtask, wherein the plurality of subtasks are in a one-to-one correspondence with data sub-blocks of transported neural network data;
    a data reading module, configured to read a first data sub-block according to the configuration information, wherein the first data sub-block is a data sub-block among data sub-blocks corresponding to the plurality of subtasks;
    a data processing module, configured to compress the first data sub-block; and a data write-out module, configured to output compressed data resulting from the compression of the first data sub-block;

wherein the data processing module comprises:
- a raw data buffer, configured to buffer the first data sub-block;
- a compression algorithm module, configured to compress the first data sub-block, to obtain compressed data resulting from the compression of the first data sub-block;
- a length field buffer, configured to buffer a length of the compressed data;
- a compression control state machine, configured to determine, according to a length of the first data sub-block and the length of the compressed data, whether there is a compression gain of the compression of the first data sub-block, generate a first channel selection signal if there is the compression gain, generate a second channel selection signal if there is no compression gain, and generate a third channel selection signal if the length field buffer misses; and
- a multiplexer, configured to read the compressed data from the compression algorithm module according to the first channel selection signal, or read the first data sub-block from the raw data buffer according to the second channel selection signal, or read the length of the compressed data from the length field buffer according to the third channel selection signal.

9. A neural network data processing method, comprising:
splitting a direct memory access (DMA) task into a plurality of subtasks and acquiring configuration information of a data sub-block corresponding to each subtask, wherein the plurality of subtasks are in a one-to-one correspondence with data sub-blocks of transported neural network data;
reading a first data sub-block according to the configuration information, wherein the first data sub-block is a data sub-block among data sub-blocks corresponding to the plurality of subtasks; and
compressing the first data sub-block and outputting compressed data resulting from the compression of the first data sub-block;

wherein the compressing the first data sub-block and outputting compressed data resulting from the compression of the first data sub-block comprises:
- buffering the first data sub-block and a length of the first data sub-block;
- compressing the first data sub-block, to obtain the compressed data resulting from the compression of the first data sub-block, and recording a length of the compressed data; and
- determining, according to the length of the first data sub-block and the length of the compressed data, whether there is a compression gain of the compression of the first data sub-block, outputting the compressed data if there is the compression gain, and outputting data of the first data sub-block if there is no compression gain.

10. The neural network data processing method according to claim 9, wherein the configuration information comprises address information of the first data sub-block, and the reading the first data sub-block according to the configuration information comprises:
reading the first data sub-block according to the address information of the first data sub-block, and shifting and splicing the read first data sub-block, to obtain a continuous and complete data stream of the first data sub-block.

11. The neural network data processing method according to claim 9, further comprising:
buffering a length of the compressed data; and
generating an address channel signal of the first data sub-block that is supported by a bus protocol according to a destination address of the first data sub-block and the length of the compressed data, and outputting the address channel signal.

* * * * *